United States Patent [19]

Bernitt et al.

[11] Patent Number: 4,819,114
[45] Date of Patent: Apr. 4, 1989

[54] WRITE-PROTECTED DATA STORAGE DISK ASSEMBLY

[75] Inventors: Charles J. Bernitt, King of Prussia, Pa.; Paul J. Mon, Rochester, N.Y.

[73] Assignee: Eastman Kodak Company, Rochester, N.Y.

[21] Appl. No.: 133,689

[22] Filed: Dec. 16, 1987

[51] Int. Cl.⁴ ............................................. G11B 23/03
[52] U.S. Cl. ..................................... 360/133; 360/137
[58] Field of Search .................. 360/60, 133, 97, 137; 369/52, 75.1

[56] References Cited

U.S. PATENT DOCUMENTS 4,463,849  8/1984  Prusak et al. ....................... 360/133
4,481,617  11/1984  Mabry ................................. 360/133

Primary Examiner—Vincent P. Canney
Attorney, Agent, or Firm—Warren W. Kurz

[57] ABSTRACT

A write-protected data storage disk assembly comprises a disk carrier having a write-protect member movably mounted thereon for movement between two positions in which it enables and inhibits the writing/erase functions of a disk drive unit. During periods of non-use, the carrier is totally contained by a protective caddy. A write-protect indicator is movably mounted on the caddy, such indicator cooperating with the carrier's write-protect member to display the present write-protect status of the disk within.

4 Claims, 5 Drawing Sheets

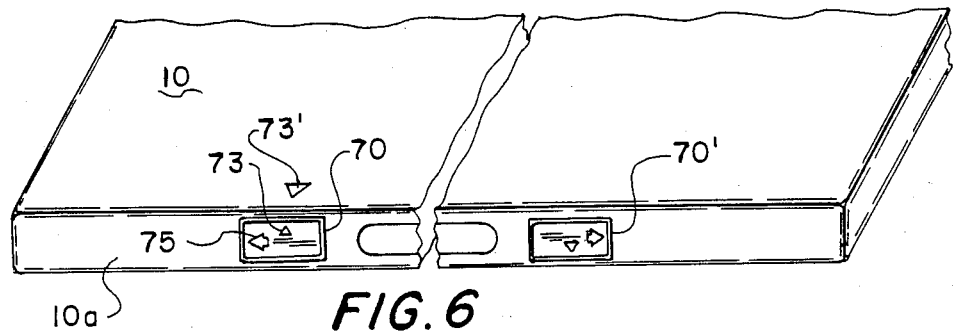
FIG. 6
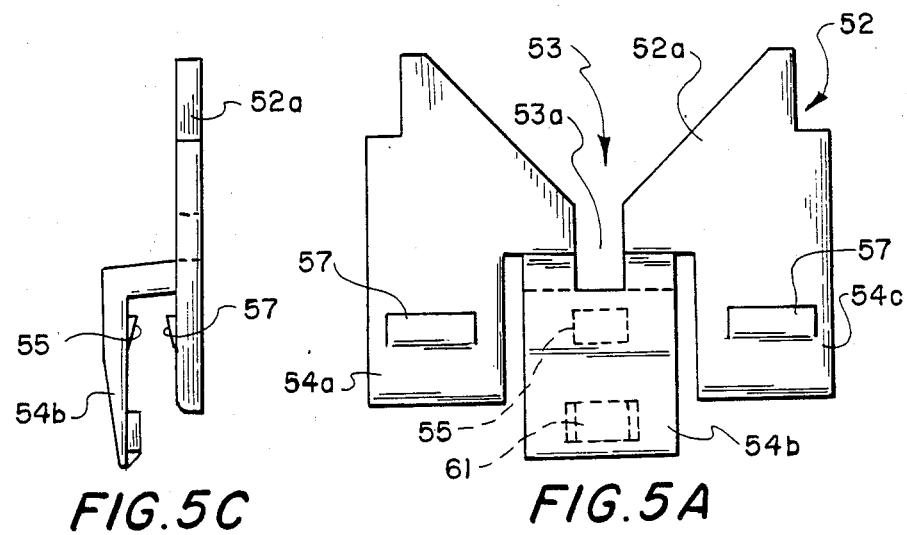
FIG. 5C
FIG. 5A
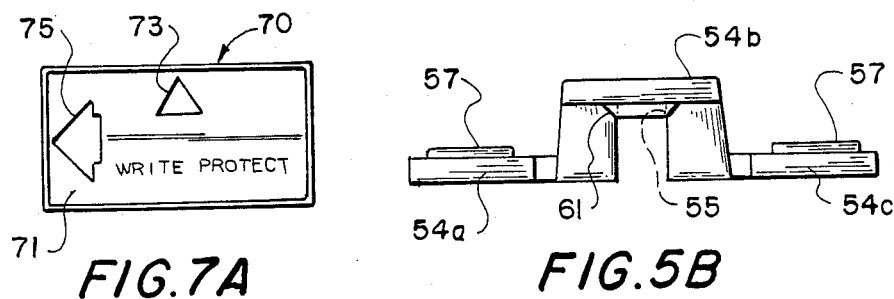
FIG. 7A
FIG. 5B
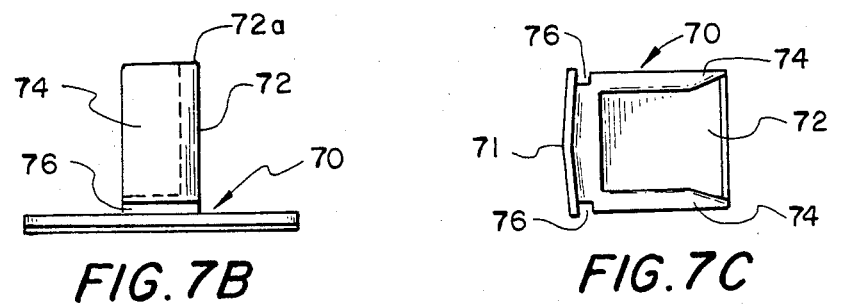
FIG. 7B
FIG. 7C

WRITE-PROTECTED DATA STORAGE DISK ASSEMBLY

BACKGROUND OF THE INVENTION

This invention relates to field of data recording and retrieval. More particularly, it relates to apparatus for "write protecting" data storage disks (e.g. optical, magneto-optical and magnetic disks) to prevent inadvertent data overwrite or erasure.

In the commonly assigned U.S. application Ser. No. 923,508, filed on Oct. 27, 1986 in the names of Dwight J. Petruchik et al., there is disclosed an optical disk assembly comprising a rectangular frame known as a "carrier" which is adapted to releasably support and retain a rigid optical disk. The carrier and its associated disk are enclosed by a box-like enclosure, known as a "caddy," which serves to protect the relatively delicate recording surfaces of the optical disk during periods of non-use. When inserted into the clean environment of a suitable disk drive unit, the carrier and its associated disk are extracted from the caddy, and the latter is returned to the user. Thereafter, the disk is released from its supporting carrier and lowered onto a spindle/turntable for rotation. Following use of the disk within the disk drive unit, the disk is returned to its carrier (which remains within the disk drive unit while the disk is being used). Thereafter, a caddy, possibly a different caddy, is reinserted into the drive unit to receive the carrier/disk assembly. After reloading the carrier/disk assembly into the caddy, the disk drive unit returns the caddy/carrier/disk package to the user.

In virtually all data storage disk assemblies, it is desirable to provide a "write-protect" feature, that is, some mechanism for preventing inadvertent overwrite and, hence, erasure of information already recorded on the disk. Such feature often takes the form of an aperture or notch formed in the disk's protective sleeve or carrier, such feature being adapted to cooperate with a sensor of some sort within the disk drive to produce a write-protect signal that can be used to either inhibit or enable writing on the disk. In optical disk assemblies, it is essential to maintain the recording surfaces of the disk substantially free of any and all contaminants; thus, in disk assemblies of the type mentioned above, it would be desirable to control the write-protect feature on the carrier from outside the caddy which encloses the carrier. This would allow the write-protect status of the disk to be changed without violating the clean-air integrity of the caddy. Also, it is desirable that the write-protect status indicator on the caddy always reflect the write-protect status of the disk/carrier contained thereby. Since it is possible, as noted above, that a disk/carrier can be reloaded, following use in a disk drive unit, into a different caddy from that which had previously contained the disk, a write-protect indicator (if any) on the caddy may, at the time of reloading, falsely reflect the write-protect status of the disk/carrier which is being reloaded into the caddy.

SUMMARY OF THE INVENTION

In accordance with the present invention, there is provided a write-protected data storage disk assembly comprising a carrier for releasably retaining a data storage disk, a write-protect member movably mounted on the carrier for movement between a first position in which it enables such data storage disk to be written upon and a second position in which it inhibits information from being written on the disk, and a box-like caddy adapted to receive and contain the disk carrier. The caddy is provided with a movable write-protect indicator which is manually movable between first and second positions indicating whether or not the disk is write-protected. When the caddy is loaded with a disk carrier, the caddy's write-protect indicator cooperates with the carrier's write-protect member so that manual movement of the caddy's write-protect indicator functions to produce a corresponding movement of the carrier's write-protect member. Preferably, a detent mechanism is provided for resisting movement of the carrier's write-protect member from either of its first and second positions, and the caddy's write-protect indicator is free to move between its first and second positions. During loading of a carrier into a caddy, a cam surface associated with the carrier's write-protect member engages the caddy's write-protect indicator and moves such indicator to a position reflecting the present write-protect status of the disk and its associated carrier.

The invention will be better understood from the ensuing detailed description of preferred embodiments, reference being made to the accompanying drawings.

BRIEF DESCRIPTION OF THE DRAWINGS

FIGS. 5A, 5B and 5C are front, top and side elevational views the write-protect member shown in FIGS. 3A, 3B, 4A and 4B;

FIG. 6 is a perspective view of a portion of the caddy shown in FIG. 1, better illustrating the caddy's write-protect indicator; and FIGS. 7A, 7B and 7C are front, top and side elevational views of the caddy's write-protect indicator shown in FIG. 6.

DETAILED DESCRIPTION OF PREFERRED EMBODIMENTS

Figure 1:
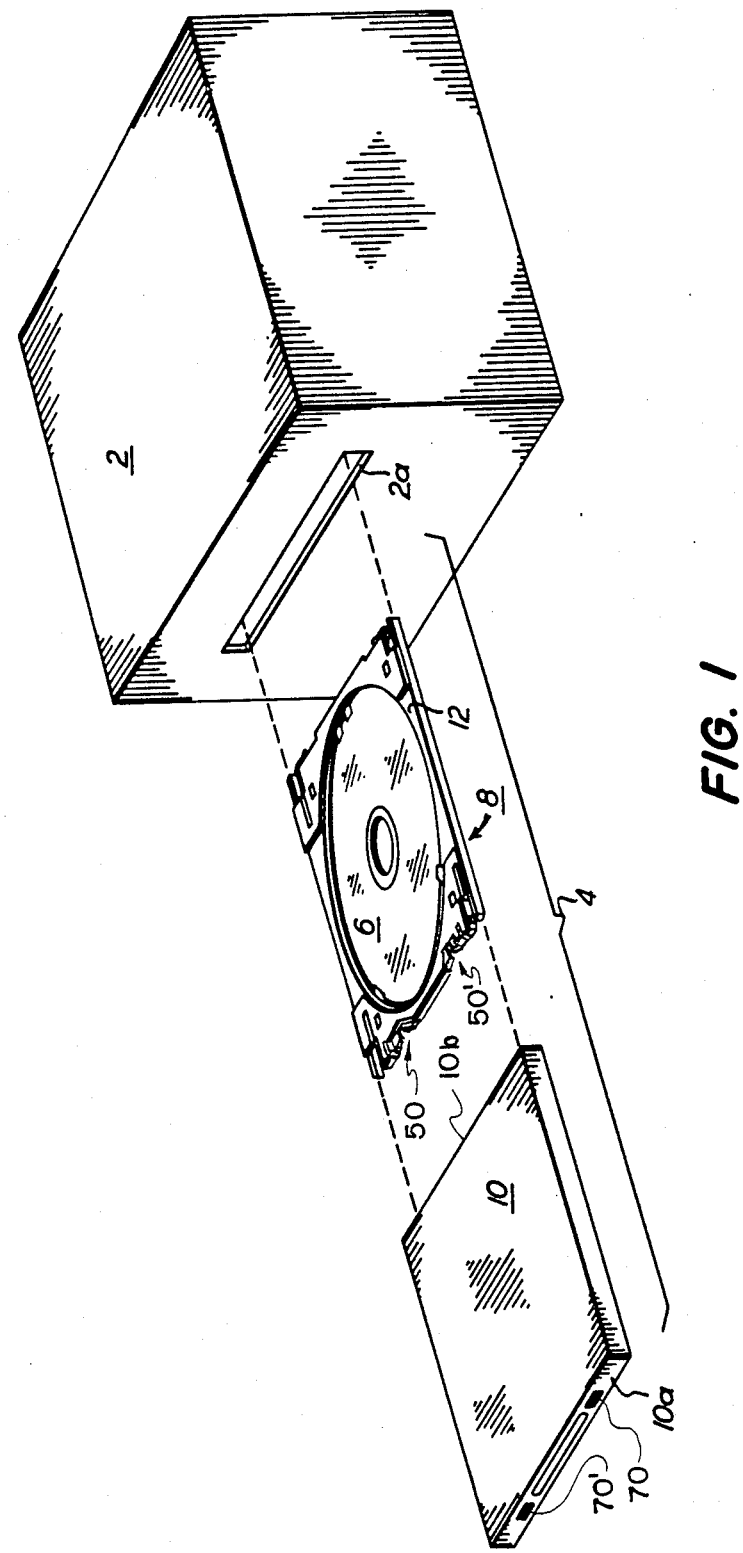
FIG. 1 is a perspective view of a data storage disk assembly incorporating a preferred embodiment of the invention.

Referring now to the drawings, FIG. 1 illustrates a data recording/playback system comprising a disk drive unit 2 and a data storage disk assembly 4. The latter basically comprises a rigid data storage disk 6, a disk carrier 8 and a box-like, protective caddy 10. As explained in the aforementioned application in the names of D. J. Petruchik et al., disk carrier 8 serves to releasably capture disk 6 so that the disk is accurately and securely registered within the carrier structure, yet is capable of being readily removed from the carrier for rotation in a plane spaced from the carrier. When not in use, the carrier and its captured disk are positioned within the protective caddy, the latter being sufficiently rigid to guard against contact with the disk's recording surfaces.

In use, the carrier-loaded caddy is inserted into the disk drive unit through a door 2a. Upon entering the disk drive unit, a mechanism within serves to extract the disk and its carrier from the caddy and to return the caddy to the user. Such extraction is effected through a pair of spring-loaded doors (not shown) mounted on the forward end 10b of the caddy. The disk drive unit also includes apparatus for releasing the disk from its carrier and for loading the disk onto a drive spindle assembly for rotation. Such apparatus is disclosed in detail in the aforementioned application.

In retrieving the disk from the disk drive unit, an empty caddy is inserted through slot 2a. A mechanism within the drive unit functions to draw the caddy into the drive unit interior and, as the caddy advances, the carrier within the drive unit reenters the caddy interior through the aforementioned caddy doors. Upon being reloaded with the disk/carrier, the caddy is returned to the user through door 2a.

Figure 2:
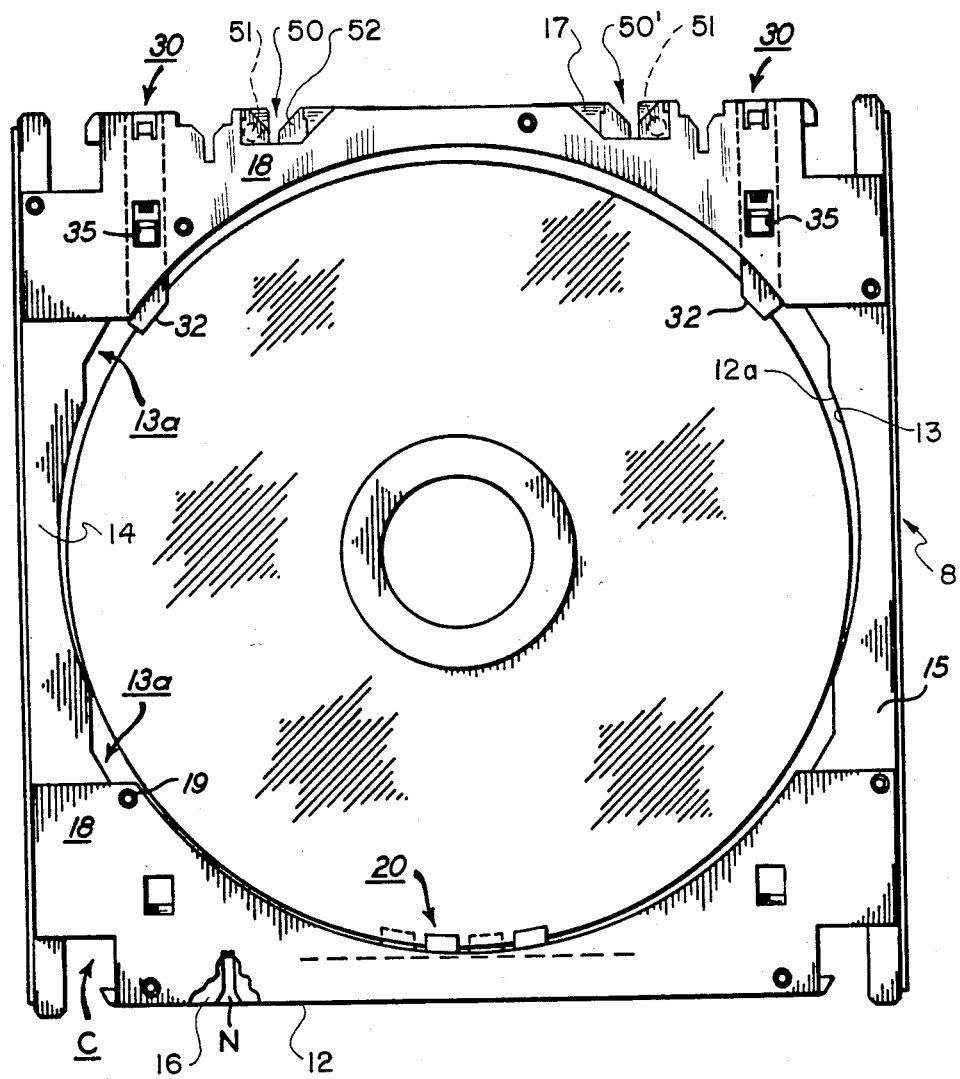
FIG. 2 is a top plan view of a disk carrier having means for write-protecting both sides of a data-storage disk.

In FIG. 2, carrier 8 is shown to comprise a planar frame 12 having a wall portion 12a which defines a generally circular aperture 13 for receiving the rigid data storage disk 6. As shown, the diameter of aperture 13 is slightly larger than the disk diameter to readily accommodate the disk. Further, the generally circular aperture 13 has four expanded regions 13a which accommodate certain disk supporting members (not shown) of the disk drive unit which serve to support the disk upon release from the carrier. In addition to certain disk latching and unlatching features, described below, the carrier frame is also provided with certain cutouts C and notches N in its leading and trailing edges (as determined by the direction in which the carrier is inserted into the disk drive unit) which cooperate with a carrier locating mechanism within the disk drive unit for precisely locating the carrier with respect to a desired axis of rotation. As a result of the geometry of such cutouts and notches, the carrier can be inserted into the disk drive unit in any one of four different orientations.

To facilitate carrier manufacture, it is preferred that frame 12 comprise various discrete elements which are mechanically coupled to provide the frame configuration shown. Such elements may comprise, for example, a pair of opposing side rails 14, 15 and end members 16, 17, all of which can be made of plastic (e.g. polycarbonate) and injection molded to produce the shapes shown. Two pair of sheet metal plates 18, e.g. made of aluminum, and suitable fasteners 19 and/or adhesive serve to connect elements 14–17 in the manner shown.

As indicated above, carrier 8 comprises disk retention means for accurately positioning and releasably capturing a disk within the plane of the carrier frame. Such disk retention means comprises disk support means 20 for engaging and supporting a disk which is urged into contact therewith at a first location along the disk periphery, and releasable latching means 30 which is adapted to selectively engage a disk at one or more other locations along the disk periphery and to urge such disk into engagement with the support means 20. Disk support means 20 may comprise a plurality of stationary support tabs 22 which are mounted on, and extend angularly from, the aperture-defining frame wall 12a. Such tabs cooperate in supporting a disk when a disk is urged into engagement therewith. Releasable latching means 30 may comprise a pair of movable, spring-loaded latching members 32 which are slidably mounted in slots defined by the carrier frame elements for movement in a direction which is generally perpendicular to the tangent at the midpoint of the arc over which support tabs 22 provide support. Each member 32 has a rectangular opening 35 having a chamfered edge which is adapted to be engaged by the tapered edge of a movable skewer (associated with a disk-release mechanism disclosed in the aforementioned Petruchik et al. Application) for the purpose of urging the latching member in a direction to unlatch and release the disk.

To prevent inadvertent overwrite of data previously recorded on the disk, disk carrier 8 is provided with a pair of "write-protect" features 50, 50', one for each of the disk's recording surfaces. The write-protect features are precisely located on the carrier frame and are adapted to cooperate with sensors within the disk drive to enable (or inhibit) the write and erase functions of the disk drive. The write-protect features may comprise, for example, a circular aperture 51 through which beam of radiation may be projected and detected. When a photoelectric sensor, for example, located within the disk drive senses radiation passing through such aperture, it produces a signal which enables (or inhibits) the write and erase functions. When no such radiation is sensed, the photoelectric sensor would produce a signal which inhibits (or enables) writing and erasing.

To control whether the disk's recording surfaces are write-protected or not, there are provided a pair of movably mounted opaque members 52, one being associated with each of the write-protect features 50. Preferably, such members are slidably mounted on the carrier frame for movement between first and second positions in which they cover and uncover, respectively, apertures 51. When in the covering first position, member 52 prevents a beam of radiation from passing through aperture 51, thereby producing, for example, an inhibit signal from the disk drive's write-protect photosensor. When member 52 is moved to its uncovering second position, a beam of radiation can pass uninterrupted through aperture 51 to produce a write enable signal from the photosensor. Obviously, the write-protect feature may, instead of being an aperture, take a variety of forms, e.g. a notch or protuberance that can be mechanically sensed. Also, the movable member 52 which selectively exposes or covers such feature need not be slidably mounted; it may, for example, be rotatably mounted on the carrier frame. It is important to note that disk carrier 8 and its associated disk 6, though temporarily separable during use in the disk drive, remain forever married; i.e. a disk will always be retained by the carrier provided by the manufacturer. Moreover, the up/down orientation of the disk cannot be changed relative to the carrier. Hence, the desired write-protect status of each disk recording surface is always reflected by the position of the write-protect members 52.

Figure 3A:
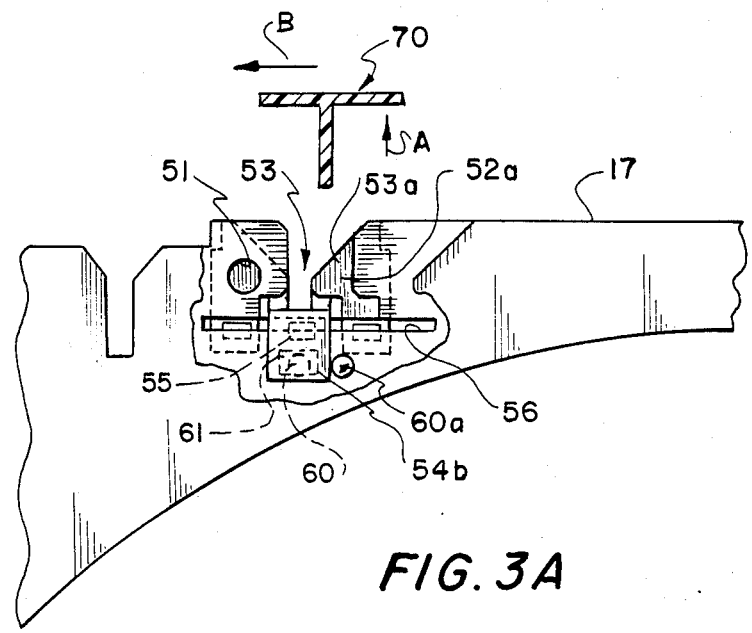
FIGS. 3A and 3B are top plan views of a portion of the carrier shown in FIG. 2 illustrating the movement of the carrier's write-protect member between two positions.
Figure 3B:
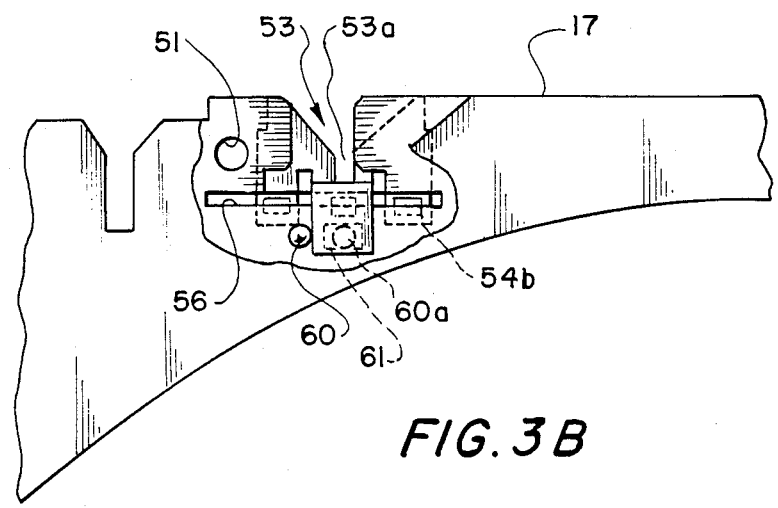
Figure 4A:
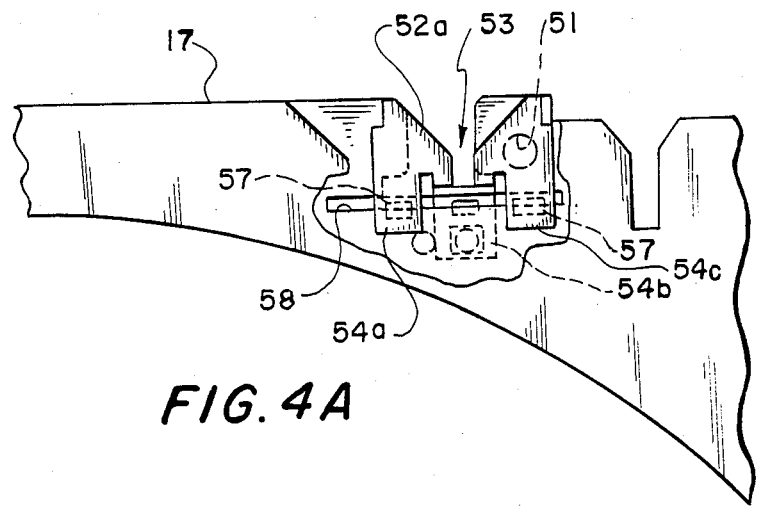
FIGS. 4A and 4B are bottom plan views of the carrier portions shown in FIGS. 3A and 3B, respectively.
Figure 4B:
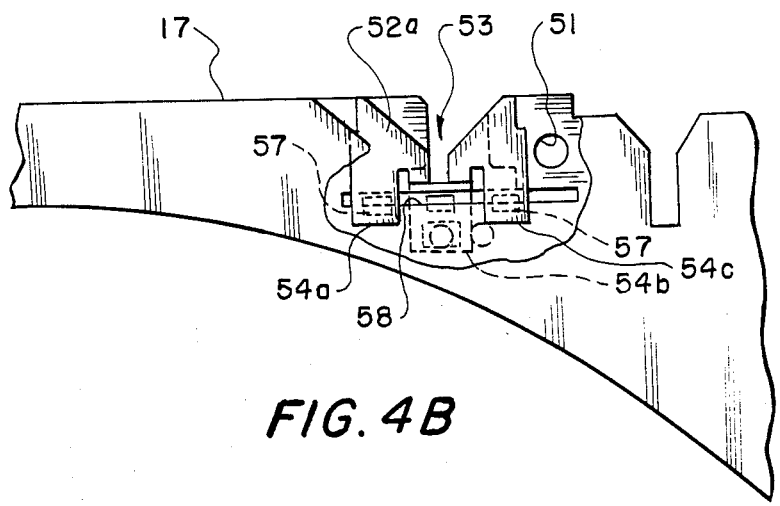

Referring to FIGS. 3A, 3B, 4A and 4B, write-protect member 52 is shown in both its covering nd uncovering positions with respect to aperture 51. As shown, member 52 comprises a radiation blocking upper portion 52A having a substantially V-shaped notch 53 formed therein, and three downwardly depending tabs 54A, 54B and 54C which straddle an edge of the carrier frame portion 17. Portion 52a is also provided with a smaller rectangular recess 53a at the base of notch 53. The base of tab 54B is provided with a small projection 55 (shown in phantom) which rides in a slot 56 formed in one side of the carrier frame portion 17. Similar inwardly-extending projections 57 are provided on tabs 54A and 54C, such projections riding in a slot 58 formed in the opposite side of the carrier frame portion 17. These projections and slots enable member 52 to slide between a first position in which one side of the notched upper portion 52A blocks aperture 51, as shown in FIGS. 3A and 4A, and a second position in which aperture 51 is free to transmit radiation, as shown in FIGS. 3B and 4B. The details of members 52 are best shown in FIGS. 5A-C. A detent mechanism is provided to resist movement of member 52 from either its first or second positions. Such detent mechanism comprises a pair of indentations 60, 60A in frame portion 17, and an inwardly extending protuberance 61 on tab 54B. The detent mechanism serves to hold write-protect member 52 in either of its first or second positions during transport of the carrier within the disk drive. Further, as explained below, the detent mechanism holds member 52 firmly in position so that, as the carrier is loaded into a caddy, member 52 can engage a movably mounted write-protect indicator 70 on the caddy and move such indicator to a position reflecting the write-protect status of the carrier/disk within.

Referring to FIG. 6, the rear end wall 10a of caddy 10 is provided with a pair of write-protect status indicators 70, 70', one for each of the recording surfaces of the data storage disk within. Each of the indicators is slidably mounted for movement between a first position indicating that the associated disk surface is write-protected, and a second position indicating that the writing and erase functions are allowable. As better shown in FIGS. 7A-C, each indicator 70 has a generally T-shaped configuration, comprising a rectangular base portion 71 having an outwardly extending stem portion 72, the latter extending into the caddy interior. As explained below, the stem portion is sized and shaped to engage the small rectangular recess 53a of the carrier's write-protect member 52 when a carrier is loaded in the caddy. The end 72a of the stem portion is bevelled on both sides to interact, as described below, with the slanted surfaces of member 52 which define V-shaped notch 53 during loading of a carrier into a caddy. A pair of flanges 74 are provided along the top and bottom edges of the stem portion 72, and slots 76 are provided on the outside surfaces of flanges 74 to allow the indicator to slide from side-to-side in a rectangular opening (hidden from view) in the carrier end wall. Important to note is that each indicator 70 has complete freedom to move between its first and second positions, i.e., there is no detent mechanism or the like to hold indicator 70 in any particular position.

When a disk/carrier assembly is loaded in a caddy, the stem portion 72 of the write-protect status indicator is positioned in recess 53a of the carrier's write-protect member. If the carrier's write-protect member 52 is in a position indicating that its associated recording surface is write-protected (i.e. in a position covering aperture 51) an indicium 73 on the base portion 71 of indicator 70 will match up with a similar indicium 73' on the caddy's top (or bottom) surfaces. If, on the other hand, member 52 is positioned to indicate that its associated recording surface is not write-protected (i.e. a non-covering portion vis-a-vis aperture 51) the two indicia 73 and 73' will be spaced apart. An arrow 75 advises the user which way to slide indicator 70 to write-protect the disk. When it is desired to change the write-protect status of the disk, the user manually moves the base portion 71 of the write-protect indicator 70. Such movement of the indicator produces a corresponding movement of member 52 owing to the engagement between stem portion 72 and the recess 53a of member 52. Though a change in write-protect status will be resisted by the aforementioned detent mechanism, the resisting force of the detent can be overridden manually. By this arrangement, the write-protect status of the disk carrier can be changed without violating the clean air integrity of the caddy.

As noted earlier, after a disk/carrier assembly has been removed from a caddy, it is possible to reload such assembly into any caddy, including one whose write-protect indicators 70 do not accurately reflect the write-protect status of the disk being loaded into it. According to the invention, the caddy's write-protect indicators will always reflect the write-protect status of a disk/carrier assembly which has been loaded into it. If, for example, either or both of the caddy's write-protect indicators are not properly positioned to reflect the current write-protect status of a disk being loaded into it, the loading movement of the carrier relative to the caddy will effect movement of the caddy's write-protect indicators to the proper position. Referring to FIG. 3A, whenever indicator 70 is not in such a position that stem portion 72 is precisely aligned with the recess 53a in member 52, a loading movement (in the direction of arrow A) will cause indicator 70 to move laterally (in the direction of arrow B) by virtue of the contact between the bevelled end of stem portion 72 and one or the other of the slanted (camming) surfaces defining the V-shaped notch 53 in member 52. Note, the detent mechanism will prevent member 52 from moving (in response to contact with indicator 70) from either of its detented positions. Since there is nothing to prevent indicator 70 from moving from side-to-side in the caddy wall, the position of indicator 70 will be controlled by the position of member 52.

From the foregoing, it will be appreciated that the write-protect status of a data storage disk which is totally enclosed by a protective caddy can be controlled from outside the caddy, thereby preserving the clean air integrity of the caddy. Also, by virtue of the interaction between the caddy's write-protect status indicators(s) 70 and the carrier's write-protect member(s) 52, indicator(s) 70 will always accurately reflect the write-protect status of a disk/carrier assembly contained by a caddy.

The invention has been described in detail with particular reference to preferred embodiments thereof, but it will be understood that variations and modifications can be effected within the spirit and scope of the invention.

We claim:

1. A data storage disk assembly comprising a data storage disk having a surface on which data is selectively recordable, said assembly comprising:

(a) a disk carrier comprising a frame for releasably supporting a data storage disk, and a write-protect member movably mounted on said frame for movement between first and second positions, said write-protect member cooperating with a sensor to enable data writing on said disk when said member is in said first position, and to inhibit data writing on said disk when said member is in said second position; and (b) a box-like caddy for protectively containing a disk carrier and a disk supported by said carrier frame, said caddy having a write-protect status indicator movably mounted thereon, said indicator being movable between first and second positions by the write-protect member of a carrier entering said container to reflect the write-protect status of a disk supported by such carrier, said indicator being manually movable to control the position of such write-protect member after the carrier is contained by said caddy.

2. The apparatus as defined by claim 1 wherein said write-protect member is slidably mounted on said carrier for movement between said first and second positions.

3. The apparatus as defined by claim 2 wherein said write-protect member has a cam surface which is adapted to interact with said write-status indicator to move said indicator to a position reflecting the write-protect status of a disk supported by such carrier.

4. The apparatus as defined by claim 1 wherein a detent mechanism is provided to resist movement of said write-protect member from either of its first and second positions.

* * * * *